Nov. 6, 1923.
W. E. HOKE
PRECISION GAUGE
Filed April 9, 1919
1,472,837
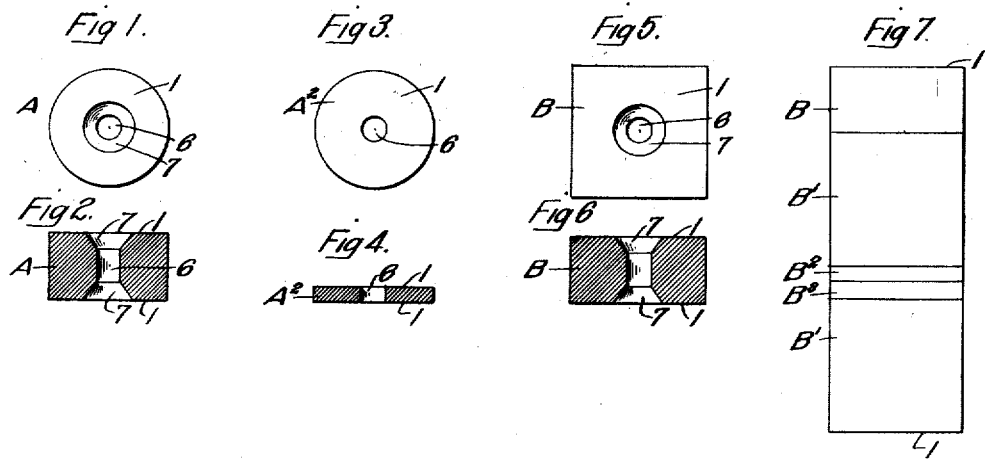
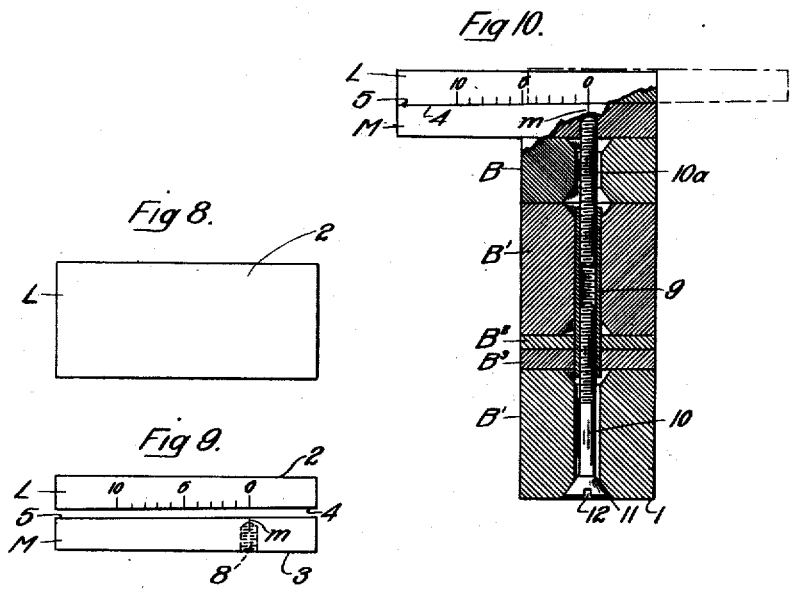
INVENTOR
William E. Hoke
BY S. Jay Teller
ATTORNEY Patented Nov. 6, 1923.

1,472,837

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

PRECISION GAUGE.

Application filed April 9, 1919. Serial No. 288,791.

*To all whom it may concern:*

Be it known that I, WILLIAM E. HOKE, a citizen of the United States, residing at St. Louis, Missouri, have invented certain new and useful Improvements in Precision Gauges, of which the following is a specification.

The object of this invention is to provide an improved gauge which includes one or more gauge blocks having opposite parallel faces at predetermined precise distances apart, and which also includes companion graduated blocks adapted to be used in conjunction with the first mentioned blocks.

In the accompanying drawing I have illustrated a gauge embodying the invention, but it will be understood that the drawing is intended for illustrative purposes only and is not to be construed as defining or limiting the scope of the invention, the accompanying claims being relied upon for that purpose.

Of the drawing:

Figs. 1 and 2, 3 and 4, and 5 and 6 are end and longitudinal sectional views respectively of different gauge blocks constructed in accordance with the invention.

Fig. 7 is a side view of a series of gauge blocks.

Fig. 8 is a plan view of one of the tapered gauge blocks.

Fig. 9 is a side view of the two companion tapered gauge blocks.

Fig. 10 is a combined side and sectional view of a complete gauge, including the series of blocks as shown in Fig. 7 and the companion tapered blocks, as shown in Figs. 8 and 9.

A gauge embodying the invention preferably consists in part of one or more gauge blocks such as are set forth in my copending application for precision gauges, Serial No. 288,787, filed on even date herewith. In Figs. 1 and 2 I have shown a gauge block A constructed in accordance with the invention. In Figs. 3 and 4 I have shown a block $A^2$ which is similar but much shorter. The blocks A and $A^2$ are circular and this shape is preferred for many purposes. However, blocks with other shapes may be provided and in Figs. 5 and 6 I have shown a square block B.

Each block has opposite parallel plane or flat end faces 1, 1 which are at a predetermined precise distance apart. By means of my improved method and machine, as set forth in my copending application for method of and machine for making gauge blocks and similar articles, Serial No. 289,591, filed April 12th, 1919, each block may be made without any error greater than one one-millionth of an inch in the flatness of the end faces or in the length between them. Ordinarily the blocks are furnished in sets with assorted lengths, the transverse size and shape of all of the blocks of the set preferably being the same. The lengths of the blocks are either multiples or definite fractions, usually decimal fractions, of a predetermined unit of length. This unit may be the inch, or the centimeter or any other convenient unit of length. If the inch is the unit decided upon, the lengths of the blocks are ordinarily multiples of a thousandth of an inch or multiples of a ten-thousandth of an inch. I will herein refer to this predetermined fraction of the standard unit such as the inch as constituting the basic unit upon which the set of blocks is based. When the inch is the standard the basic unit is ordinarily a thousandth of an inch or a ten-thousandth of an inch. For a given set of blocks with lengths in multiples of thousandths the lengths may be so selected as to make it possible, by combining different blocks in wringing contact end to end, to form a series having any desired length measured in inches and thousandths; and, by adding to the set other blocks having lengths in multiples of ten-thousandths it is possible, by combining the blocks, to form a series having any desired length measured in inches and ten-thousandths Such a series of blocks is illustrated in Fig. 7. The total length of the series is obviously the sum of the total lengths of the individual blocks B, $B^1$, $B^2$, $B^3$ and $B^1$. By properly selecting the several blocks any desired total length can be secured.

In conjunction with the regular blocks, such as described, I provide one or more supplemental gauge elements different from the blocks but also having opposite gaging faces in predetermined precise relationship. As will be hereinafter set forth, I provide special means whereby these supplemental gauge elements may be connected with the regular blocks.

As shown in Figs. 8 and 9, the supplemental gauge elements are in the form of two companion sliding parallels or blocks L and M which are preferably rectangular in plan, though I do not limit myself as to the shape. The blocks L and M have opposite outer faces 2 and 3 and adjacent inner faces 4 and 5. The two inner faces 4 and 5 are inclined with respect to the outer faces 2 and 3. The inclination is very slight, that shown in the drawing being greatly exaggerated. The amount of inclination of the two faces is the same, and the result is that when the faces 4 and 5 are in contact the faces 2 and 3 are parallel. The two blocks L and M are at one side and provided respectively with lines O and m adapted to register with each other. When the two faces 4 and 5 are in contact and the two marks are in register, the distance between the outer faces 2 and 3 is definite and predetermined, as for instance one-half of the predetermined unit of length.

One of the blocks, as for instance L, is provided with graduations, those shown ranging from 0 to 10. When the regular gauge blocks are made in multiples of a thousandth of the predetermined unit, then the amount of inclination from the 0 mark to the 10 mark is a thousandth of the predetermined unit. It will be seen that by sliding one of the blocks upon the other the distance between the faces 2 and 3 can be increased, the amount of increase being read on the scale in ten-thousandths of an inch.

When the blocks L and M are placed at the end of a series of regular blocks, as shown in Fig. 10, they make it possible for measurements to be made in ten-thousandths of the predetermined unit even though the regular blocks are made only in multiples of a thousandth. As shown by full lines in Fig. 10, the total length is the sum of the lengths of the several blocks B, B¹, B², B³ and B⁴ together with the thickness of the blocks L and M at the 0 position. By sliding the block L, as indicated by dotted lines in Fig. 10, this distance can be increased by a thousandth or any fraction thereof, as read on the decimal scale from 0 to 10.

It is well known that several gauge blocks of the type herein shown will adhere to each other, or to other objects having flat surfaces, with considerable force when properly wrung into contact. It is therefore possible, and in many cases preferable, to combine the blocks and other elements and to use them without any special mechanical means for holding them together. I prefer, however, to make it possible to connect the several parts mechanically so that reliance need not be placed solely upon the force resulting from wringing contact. Each element is therefore provided with an abutment preferably located between the opposite gaging faces thereof or at least between the confines of the said gaging faces. The abutment is adapted to be engaged by a suitable connecting means which extends from one element to another. The said connecting means is so constructed and arranged that it holds the several blocks or elements together but nevertheless leaves unobstructed the outer gaging faces of the end blocks or elements so that they can be used for gaging purposes. With the elements thus mechanically connected a strong and rigid gauge is secured which can be handled in the same way as an integral site end of the gauge from the members.

Preferably each block is provided with an opening to receive the connecting means, and, as illustrated, the opening in each of the regular blocks is a central hole 6 extending entirely through the block. When the block has its end faces flat and parallel the hole 6 extends perpendicularly to the said parallel faces. Preferably the opening or hole in each block is utilized to form the abutment which is engaged by the connecting means, this abutment being located, as aforesaid, between the opposite gaging faces. When the opening is a central through hole, such as 6, the abutment is formed by countersinking the hole at least at one end as indicated at 7. Preferably the hole is countersunk at both ends to provide separate abutments, but this is not essential. One of the supplemental gauge elements as for instance the tapered block M, is provided with a hole 8 perpendicular to the outer surface 3 and located near the mark m. The hole 8 is threaded to form an abutment for the engagement of a threaded connecting means, this abutment being located between the opposite gaging faces of the block.

As a connecting means I preferably provide a suitable tie rod adapted to extend through or into the holes in the several blocks. The tie rod may be varied as to details, but the construction illustrated in Fig. 10 has been found convenient. This consists of a central threaded tube 9 adapted to enter the holes in the regular blocks, and two screws 10 and 10ᵃ entering the tube. The screw 10 is formed with a head 11 adapted to enter the countersink in the outermost end of the block opposite the blocks L and M, in this case the block B¹. The head 11 is so formed as to lie below the outer surface of the block B¹. The screw 10ᵃ is threaded at both ends and at its outer end it enters the threaded hole 8 in the block M. It will be seen that by turning the screw 10 the tie rod as a whole can be shortened to draw and hold the blocks together. The head 11 is preferably provided with a slot 12 to permit the use of a screw driver.

What I claim is:

1. A gauge comprising in combination one or more gauge blocks each provided with opposite parallel flat gaging faces at a predetermined precise distance apart and each provided with a through hole extending from one face to the other and countersunk to provide an abutment located between the opposite gaging faces thereof, a supplemental gauge element different from the blocks but also having opposite gaging faces in predetermined precise relationship, the supplemental gauge element having at least one flat face and the supplemental element and the several blocks respectively having face to face wringing or surface engagement with each other, the said supplemental gauge element being provided with a threaded hole perpendicular to the said flat face thereof, and a tie rod extending respectively into and through the holes in the supplemental element and in the blocks and serving to connect them together with their respectively adjacent flat faces in contact as aforesaid, the tie rod being threaded at one end to enter the threaded hole in the supplemental element and having a head at the other end engaging the countersunk abutment of the block at the opposite end of the gauge from the supplemental element and positioned to leave unobstructed the outer gaging face thereof.

2. A gauge comprising in combination a pair of companion sliding members having graduations thereon, one of the said members being provided with an abutment located between the confines of the opposite gaging faces thereof, one or more gauge blocks each provided with opposite parallel flat faces at a predetermined precise distance apart and each also provided with an abutment located between the confines of the opposite gaging faces thereof, the last said member and the said blocks respectively having face to face wringing or surface contact with each other, and connecting means engaging the abutments of the last said member and of the blocks and serving to connect them together with their respectively adjacent flat faces in contact as aforesaid and positioned to leave unobstructed the inclined gaging face of the said member and the outer gaging face of the block at the opposite end of the gauge from the members.

3. A gauge comprising in combination a pair of companion sliding members having inclined faces and graduations thereon, one of the said members being provided with an opening therein the walls of which form an abutment located between the opposite gaging faces thereof, one or more gauge blocks each provided with opposite parallel flat faces at a predetermined precise distance apart and each also provided with an opening therein forming an abutment located between the opposite gaging faces thereof, the last said member and the said blocks respectively having face to face wringing or surface contact with each other, and connecting means extending into the said opening and engaging the abutments of the last said member and of the blocks and serving to connect them together with their adjacent flat faces in contact as aforesaid and positioned to leave unobstructed the inclined gaging face of the said member and the outer gaging face of the block at the opposite end of the gauge from the member.

4. A gauge comprising in combination a pair of companion sliding members having graduations thereon, one of the said members being provided with a threaded hole therein perpendicular to one gaging face, one or more gauge blocks each provided with opposite parallel flat faces at a predetermined precise distance apart and each provided with a through hole therein extending from one face to the other and countersunk to provide an abutment located between the opposite gaging faces thereof, the last said member and the said blocks respectively having face to face wringing or surface contact with each other, and a tie rod extending respectively into and through the holes in the said member and in the blocks and serving to connect them together with their respectively adjacent flat faces in contact as aforesaid, the said tie rod being threaded at one end to enter the threaded hole in the member and having a head at the other end engaging the countersunk abutment of the block at the opposite end of the gauge from the members and positioned to leave unobstructed the outer gaging face thereof.

5. A set of gauge blocks each having opposite parallel flat end faces, the several blocks being of similar cross sectional shape but having differing lengths in multiples of a predetermined basic unit, so that by selecting the proper blocks or by combining different blocks of the set any desired multiple of the basic unit may be obtained up to the capacity of the set, in combination with a pair of companion sliding members at least one of which is provided with a flat face adapted to engage the end face of a block, the said members having their adjacent faces inclined and one of them being graduated adjacent the inclined face, the inclination being so related to the graduations that each of the latter represents a known fraction of the aforesaid basic unit, whereby multiples of the basic unit may be obtained by selecting or combining blocks and whereby fractions of the basic unit may be obtained by sliding one of the members on the other in accordance with the graduations.

6. A gauge comprising in combination one or more gauge blocks having lengths in multiples of a predetermined basic unit and each having opposite parallel flat end faces in face to face wringing or surface contact with each other, and a pair of companion sliding members at least one of which is provided with a flat face in face to face wringing or surface contact with the end face of a block, the said members having their adjacent faces inclined and one of them being graduated adjacent the inclined face, the inclination being so related to the graduations that each of the latter represents a known fraction of the aforesaid basic unit, whereby the combined length of the blocks is a multiple of the basic unit and whereby fractions of the basic unit may be obtained by sliding one of the members on the other in accordance with the graduations.

7. A gauge comprising in combination one or more gauge blocks having lengths in multiples of a predetermined basic unit and each having opposite parallel flat end faces in face to face wringing or surface contact with each other, and a pair of companion sliding members at least, one of which is provided with a flat face in face to face wringing or surface contact with the end face of a block, the said members having their adjacent faces inclined and one of them being graduated adjacent the inclined face, the said members at the zero position of the graduations having their opposite faces at a distance apart which is a predetermined multiple of the said basic unit and the inclination being so related to the graduations that each of the latter represents a known fraction of the aforesaid basic unit, whereby the combined length of the blocks and of the members at zero position is a multiple of the basic unit and whereby fractions of the basic unit may be obtained by sliding one of the members on the other in accordance with the graduations.

8. A gauge comprising in combination one or more gauge blocks having lengths in multiples of a predetermined basic unit and each having opposite parallel flat end faces in face to face wringing or surface contact with each other, a pair of companion sliding members at least one of which is provided with a flat face in face to face wringing or surface contact with the end face of a block, the said members having their adjacent faces inclined and one of them being graduated adjacent the inclined face, the inclination being so related to the graduations that each of the latter represents a known fraction of the aforesaid basic unit, whereby the combined length of the blocks is a multiple of the basic unit and whereby fractions of the basic unit may be obtained by sliding one of the members on the other in accordance with the graduations, and means for connecting the blocks and one of the members together.

In testimony whereof, I hereto affix my signature.

WILLIAM E. HOKE.

Certificate of Correction.

It is hereby certified that in Letters Patent No. 1,472,837, granted November 6, 1923, upon the application of William E. Hoke, of St. Louis, Missouri, for an improvement in "Precision Gauges," errors appear in the printed specification requiring correction as follows: Page 2, line 78, strike out the words "site end of the gauge from the members" and insert instead the word *gouge;* same page, after line 96 insert the sentence *The countersinks may be omitted in the case of short blocks such as $A^2$ or $B^2$;* and that the said Letters Patent should be read with these corrections therein that the same may conform to the record of the case in the Patent Office.

Signed and sealed this 18th day of December, A. D., 1923.

[SEAL.] 
KARL FENNING,
*Acting Commissioner of Patents.*